May 2, 1961  G. L. ROGERS  2,982,135
FLOW METER
Filed May 3, 1957
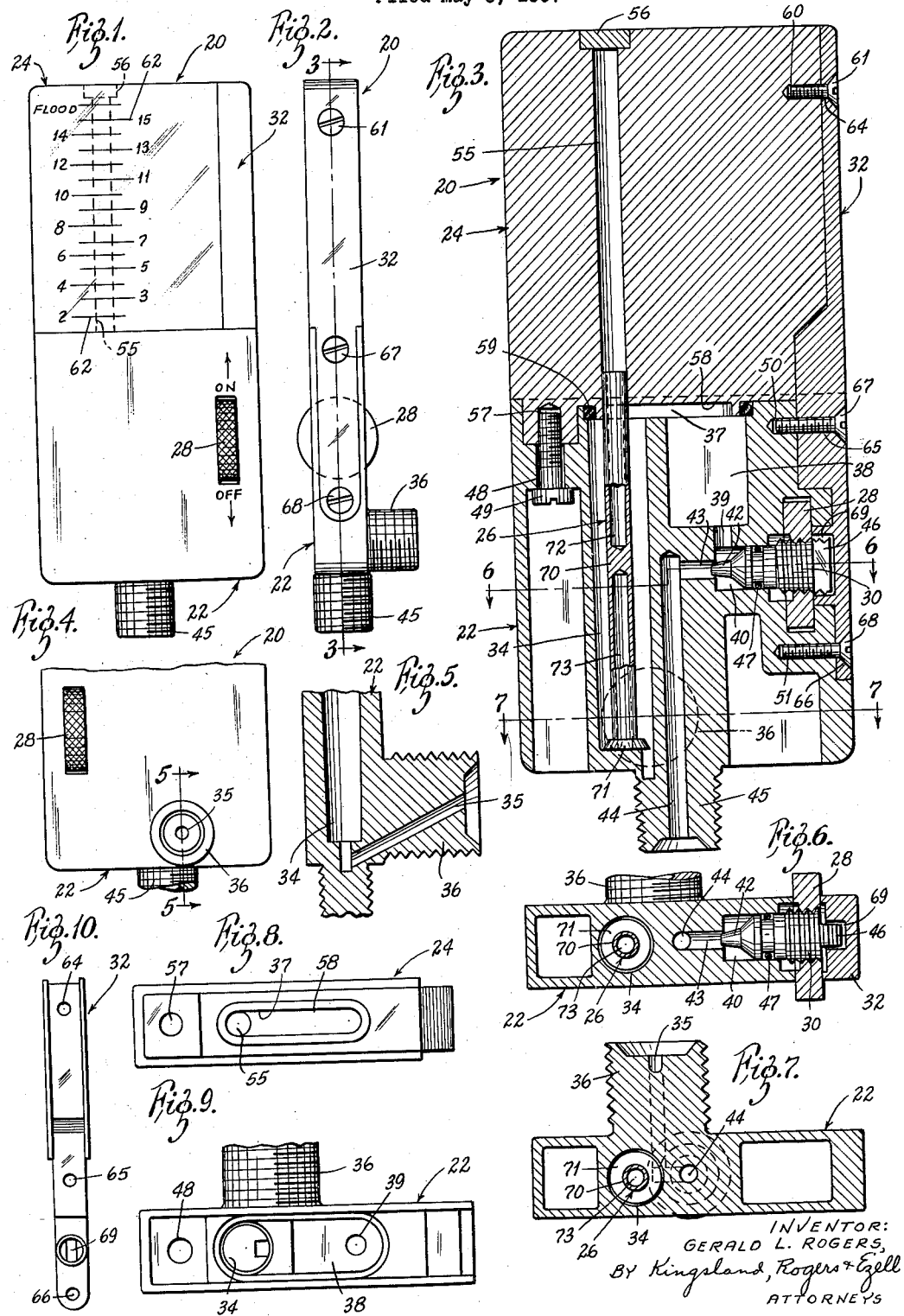
INVENTOR:
GERALD L. ROGERS,
BY Kingsland, Rogers & Ezell
ATTORNEYS United States Patent Office 2,982,135
Patented May 2, 1961

2,982,135
FLOW METER
Gerald L. Rogers, Olivette, Mo., assignor to Stile-Craft Manufacturers, St. Louis, Mo., a corporation of Missouri Filed May 3, 1957, Ser. No. 656,811
1 Claim. (Cl. 73—209)

The present invention relates generally to fluid flow measuring devices, and more particularly to a flow meter for measuring gases.

In brief, the present novel flow meter includes a molded housing, preferably of nylon plastic, a window member preferably of acrylic, a lightweight float of aluminum, or the like, within the housing and extending into the window member, a metal valve wheel and stem, and a retainer member, preferably of nylon for connecting the housing and the window member.

An object of the present invention is to provide a novel flow meter for gases which is of simple construction for replacement of existing complicated and other units.

Another object is to provide a novel flow meter for gases which accurately measures the gas, and which will so function for a long period of time without maintenance.

Another object is to provide a novel flow meter for gases which is relatively inexpensive and therefore may be used in such large numbers in hospitals, for example, to measure oxygen as to provide a measuring device in each room.

Another object is to provide a novel flow meter for gases which may be readily attached to an oxygen tank, for example, for immediate use, and which may be easily, readily and accurately read at various distances away from the device.

The foregoing and other objects and advantages are apparent from the following description taken with the accompanying drawing, in which:

Figure 1 is a front elevational view of a flow meter incorporating the teachings of the present invention;

Figure 2 is a side elevational view thereof looking toward the right end of Figure 1;

Figure 3 is an enlarged cross-sectional view taken on substantially the line 3—3 of Figure 2;

Figure 4 is a fragmentary rear elevational view looking at the lower part of the side opposite to that of Figure 1;

Figure 5 is an enlarged cross-sectional view taken on substantially the line 5—5 of Figure 4;

Figure 6 is a horizontal cross-sectional view taken on substantially the line 6—6 of Figure 3;

Figure 7 is a horizontal cross-sectional view taken on substantially the line 7—7 of Figure 3;

Figure 8 is a bottom end view of the window member;

Figure 9 is a top end view of the housing; and

Figure 10 is a view of the inner side of the retainer member.

Referring to the drawing more particularly by reference numerals, 20 indicates generally a flow meter constructed in accordance with the teachings of the present invention. The flow meter 20 includes a multi-passage housing 22, a window member 24, an indicator float 26, a metering valve actuating wheel 28, a metering valve member 30, and a retainer member 32.

The housing 22 is of the configuration clearly shown in the drawing, and includes a first vertical passage 34 of annular tapered cross section, increasing from bottom to top, with which a transverse intake passage 35 communicates at the bottom thereof (Fig. 5), the passage 35 being in a threaded nipple 36. The vertical passage 34 opens into a transverse passage 37 emptying into a vertical well 38. A vertical passage 39 connects the well 38 with a cylindrical chamber 40 within which is disposed the metering valve member 30 in sealing relation.

The metering valve member 30 is threadedly mounted in the valve actuating wheel 28 for transverse movement, as is clear from Figures 3 and 6. The metering valve member 30 has a valve portion 42 which extends into a transverse passage 43 leading from the chamber 40 and communicating with a vertical discharge passage 44 which empties through a threaded nipple 45 and a rear rotation prevention portion 46 of rectangular cross section. An O-ring 47 is provided for sealing purposes.

Viewing Figure 3, at the upper left of the housing 22 is an opening 48 which receives a screw 49, and at the right are threaded transverse screw receiving wells 50 and 51.

The window member 24 is of the configuration clearly shown in the drawing, and includes a vertical passage 55 which communicates with the vertical passage 34 (Fig. 3) and which is closed by a plug 56. A threaded well 57 receives the screw 49. An inset portion 58 forms the top wall of the passage 37. An O-ring 59 seals the juncture of the window member 24 with the housing 22 around the inset portion 58. A threaded well 60 is provided to receive a screw 61. Quantity indication lines 62 calibrated at given pressure and temperature and appropriate figures are provided (Fig. 1).

The retainer member 32 is of the configuration illustrated in the drawing, and includes spaced screw receiving apertures 64, 65 and 66 through which extend the screw 61 and screws 67 and 68, respectively. An oblong chamber 69 receives the rotation prevention portion 46.

Within the vertical passage 34 and extending into the passage 35 is the indicator float 26 which includes a cylindrical stem 70 and a base 71. The float 26 has wells 72 and 73 which are formed in the individual calibration of each float 26. The stem 70, when colored red for example, gives a thermometer effect and is easily read.

In use, the flow meter 20 is attached to the outlet of an oxygen tank (not shown), for example, by the nipple 36. Oxygen will flow through the passage 35, the passage 34 in which it engages and passes the indicator float 26, the passage 37, the well 38, the passage 39, the chamber 40, thence by the valve portion 42 of the metering valve member 30, through the passage 43, and out through the passage 44 and to the point of use through suitable connections. The metering valve member 30 is downstream of the indicator float 26, thereby providing a pressure compensation arrangement, and is adjustable in respect to the opening of the passage 43 by the wheel 28 to determine the oxygen flow, the rate of which is indicated by the top of the float 26 in relation to the lines 62. The position of the float 26 is a function of oxygen flow, weight of the float 26 and cross section of the passage 34.

It is manifest that there has been provided a flow meter which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claim which follows.

What is claimed is:

In combination, a compact flow meter for gases comprising a housing of plastic material, a window member of clear plastic material mounted directly on said housing and secured thereto in a manner providing a small integrated rectangular unit, said window having a vertical passage and exterior markings, connected passages in said housing and between said housing and said window member providing a flow path for a fluid, on a metering valve within said housing for controlling the flow of gas through the passages therein, means for adjusting said metering valve, threaded nipples providing means for connecting said flow meter and said flow path to a source of fluid, and a light weight indicator float disposed within one of said connected passages in said housing comprising a base and a vertical stem, said base and stem being of a length substantially equal to the length of said housing, said vertical stem cooperating with said markings to indicate the rate of flow through said flow meter, said metering valve being downstream from said indicator float.

References Cited in the file of this patent

UNITED STATES PATENTS

| | | |
|---|---|---|
| 1,641,744 | Decker | Sept. 6, 1927 |
| 2,388,672 | Brewer | Nov. 13, 1945 |
| 2,655,041 | Jacobson | Oct. 13, 1953 |
| 2,778,223 | Kimbrell | Jan. 22, 1957 |